(12) United States Patent
Swart et al.

(10) Patent No.: US 12,037,465 B2
(45) Date of Patent: Jul. 16, 2024

(54) DEVICE TO CONVERT WASTE RESIN INTO SOLID FORM

(71) Applicant: Oddbox Holdings, Inc., Irvine, CA (US)

(72) Inventors: Mark Andrew Swart, Irvine, CA (US); Cameron Williams, Irvine, CA (US)

(73) Assignee: ODDBOX HOLDINGS, INC., Irvine, CA (US)

( * ) Notice: Subject to any disclaimer, the term of this patent is extended or adjusted under 35 U.S.C. 154(b) by 150 days.

(21) Appl. No.: 18/222,381

(22) Filed: Jul. 14, 2023

(65) Prior Publication Data

US 2023/0357528 A1 Nov. 9, 2023

Related U.S. Application Data

(63) Continuation of application No. PCT/US2022/016631, filed on Feb. 16, 2022.

(60) Provisional application No. 63/297,616, filed on Jan. 7, 2022, provisional application No. 63/155,632, filed on Mar. 2, 2021.

(51) Int. Cl.
*C08J 11/06* (2006.01)
(52) U.S. Cl.
CPC ..................... *C08J 11/06* (2013.01)
(58) Field of Classification Search
USPC ......................................................... 521/40
See application file for complete search history.

(56) References Cited

U.S. PATENT DOCUMENTS

| | | | |
|---|---|---|---|
| 4,675,140 A | 6/1987 | Sparks | |
| 5,370,234 A | 12/1994 | Sommer | |
| 5,625,398 A | 4/1997 | Milkovits | |
| 7,323,248 B2 * | 1/2008 | Ramsey | ................ C08K 3/011 |
| | | | 522/42 |
| 2003/0066296 A1 | 4/2003 | Niechial | |
| 2005/0203202 A1 | 9/2005 | Weine | |

OTHER PUBLICATIONS

International search report for PCT/US22/16631 dated Jun. 22, 2022 (19 pages).

\* cited by examiner

*Primary Examiner* — Terressa Boykin
(74) *Attorney, Agent, or Firm* — Manuel de la Cerra

(57) ABSTRACT

An apparatus for hardening waste resin is disclosed herein. The apparatus includes a container for holding the waste resin, the container having an outlet. The apparatus may also have a container pivot about which the container may rotate to a tilt position that allows waste resin to flow out of the outlet under the force of gravity, over a comb with a plurality of teeth. The teeth are constructed to separate the waste resin into waste resin droplets under the force of gravity. A conveyor surface is positioned below the comb to receive the waste resin droplets, and the conveyor surface moves as it receives the waste resin droplets. A plurality of UV lights is positioned to illuminate the conveyor surface and to cause the waste resin droplets thereon to harden. The conveyor surface may be removable.

24 Claims, 18 Drawing Sheets

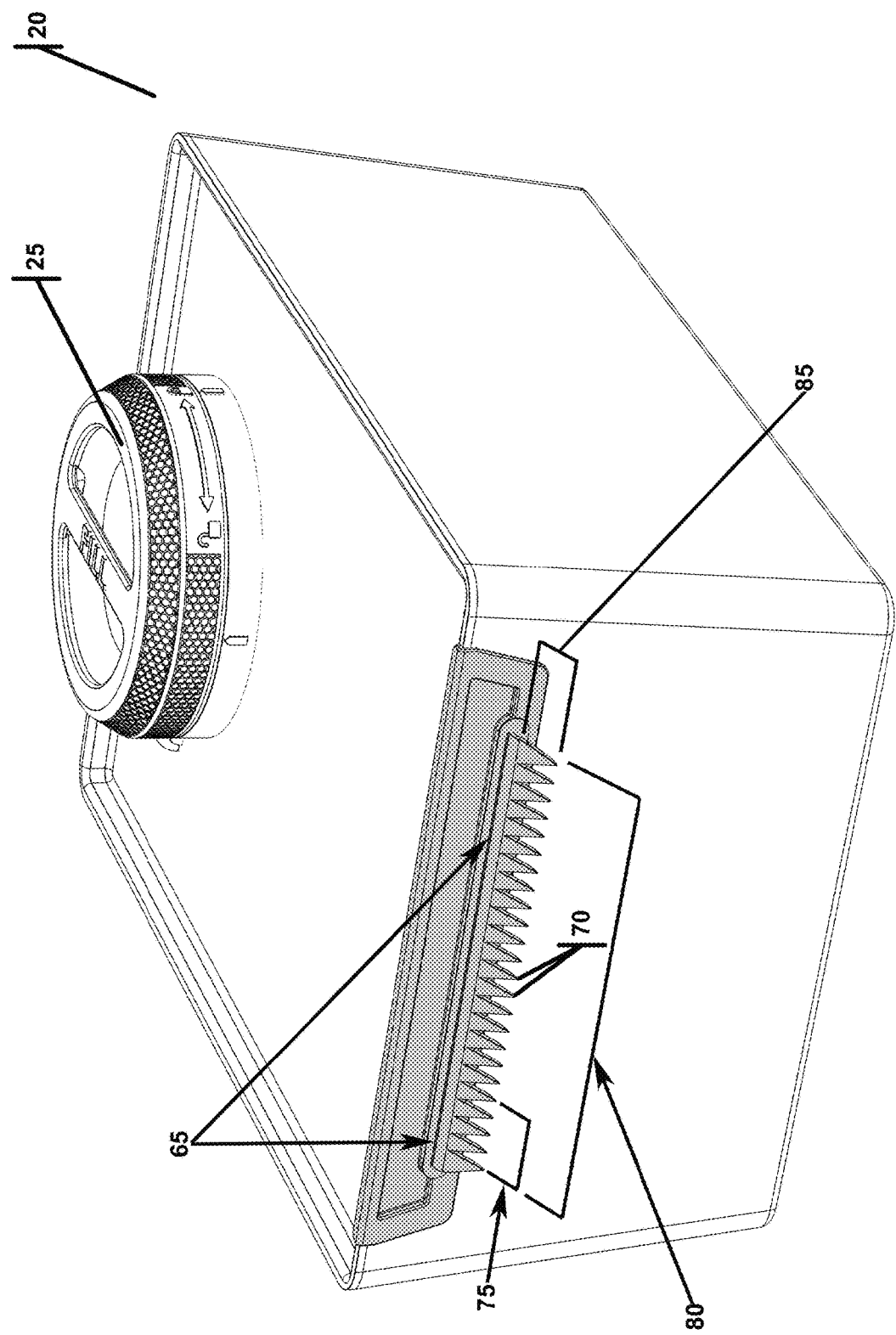
FIG. 2B1

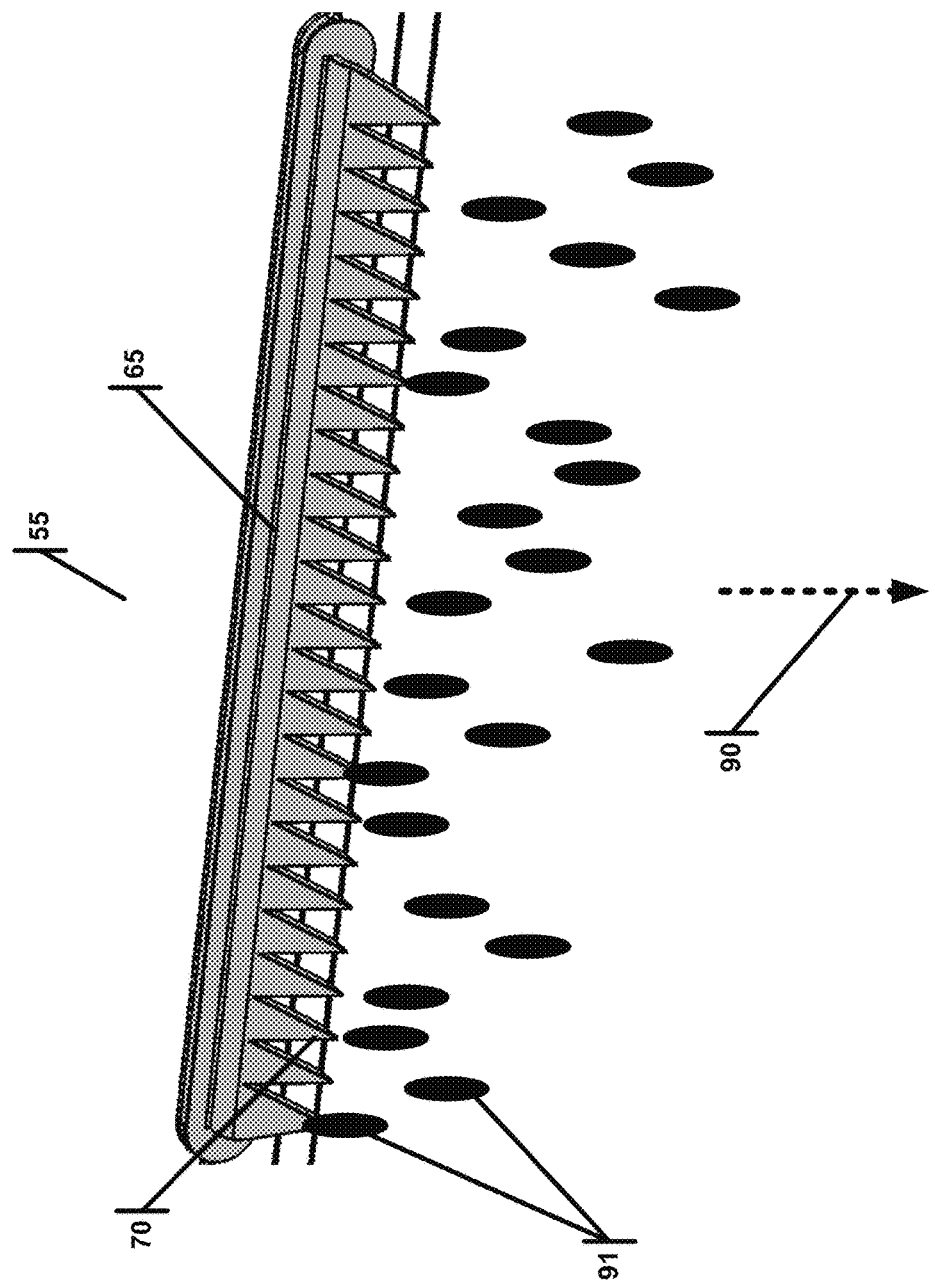
FIG. 2B2

UV Transparent Disposable
Drum

UV Transparent Disposable
Conveyor Belt

DEVICE TO CONVERT WASTE RESIN INTO SOLID FORM

TECHNICAL FIELD

The present disclosure relates generally to three-dimensional printing, and more specifically relates to methods and devices for hardening waste resin.

PRIORITY APPLICATIONS

This application claims priority as a continuation of PCT application PCT/US22/16631 filed on Feb. 16, 2022 and titled "Device to Convert Waste Resin into a Solid Form", which claims priority to U.S. Provisional Application Ser. No. 63/155632 filed on Mar. 2, 2021 and titled "Device to Convert Waste Resin into a Solid Form", and to U.S. Provisional Application Ser. No. 63/297616 filed on Jan. 7, 2022 and titled "Device to Convert Waste Resin into a Solid Form". Each of the patent applications is incorporated by reference as if fully set forth herein.

BACKGROUND

All resin-based 3D printing technologies produce hazardous waste resin that must be disposed of safely. The following is an overview of how waste resin is produced in the three most prolific resin 3D printing technologies.

First, Polyjet 3D printers work by ink jets printing tiny droplets of resin one layer at a time on a build platform. The UV lights attached to the print head simultaneously cure the resin, forming a single, fully cured cross-section of the parts on the build platform. Once a cross-section is completed, the build platform is lowered in the Z direction, and the process is repeated for the next layer until the part is completed. Polyjet waste resin is generated in three ways. (1) Interval Cleaning: At pre-determined intervals during the print process, the print head travels to the side of the build platform and automatically jets small amounts of resin through the print head nozzles into a waste reservoir. This process clears the nozzles and, in effect, cleans the print heads. Although a very small amount of material gets wasted in each interval, this process continues, and the waste accumulates over time. (2) Material Changeover: When an operator loads the printer with a different resin, there is a purge cycle to clear the printer of the previously used resin. For example, when changing from VeroBlack to VeroWhite, the VeroBlack that is residing in the printer's heads and hoses is purged into the waste container. (3) Expiration: Polyjet materials have a shelf life of 12 to 14 months and will expire if left unused. Each container has an RFID tag with the expiration date. This prevents damage to the printer, since expired material will coagulate and clog up the print heads.

Second, SLA 3D printers work by beaming a UV laser onto a vat filled with UV light-sensitive resin. When the laser hits the resin, it cures the resin from a liquid to change it to a solid. After parts are printed and removed from the vat, the user must pour additional resin into the vat to "top it off". Typical vat volumes are anywhere from 0.2 Liters (Formlabs Form 2) to 414 Liters (3D Systems ProX 800). SLA waste resin is generated in the following three ways. (1) Post Processing: When cleaning SLA parts, the parts are bathed in IPA (Isopropanol), which removes any excess uncured waste resin. Over time, the IPA becomes semi-saturated with uncured waste resin and must be disposed of. (2) Contamination: SLA systems utilize an open vat configuration. If the vat gets contaminated with foreign debris or partially cured remnants from previous print runs, then it needs to be replaced. (3) Expiration: SLA resins have a shelf life of 18 to 24 months and, upon expiration, the material must be disposed of properly.

Third, DLP 3D Printers work by using a UV light projector to flash an image onto a vat (build tray) filled with UV light-sensitive resin. When the UV light image is projected onto the resin, the resin is partially cured from a liquid to a solid. After parts are printed and removed from the vat, the user must pour additional resin into the vat to "top it off". Typical vat volumes are small, which enables the user to easily change build trays. The DLP waste resin is generated in the same ways as those of SLA printing discussed above. In fact, the effect of expiring resins is more acute with DLP printers because the resins used are more unstable than SLA resins and typically have shorter shelf lives. Some of the two-part resins, such as the EPX 82 from Carbon 3D, once mixed, only last for 24 hours and must be disposed thereafter. Some Carbon customers report disposing of as much as 1 gallon per month of uncured DLP resin.

The waste resin created by these printers is hazardous and must be disposed of safely, yet current disposal methods are expensive and labor-intensive. For example, one such method is to leave the waste resin in its liquid state and to contact a hazardous waste management company to dispose of the material. However, first the user or business generating resin waste must be registered with the Environmental Protection Agency as a generator of such waste, and in cases like this, the generator is required to store large drums of resin waste on-site until sufficient quantities are collected for pickup. This is expensive and hazardous.

Another current method is to convert the waste into a solid form so that it can be disposed of in an ecologically safe and a cost-effective conventional manner. This method is labor-intensive because the waste resin can only be processed in very thin layers while exposing it to UV light, approximately .06 inches. The thin layers of resin are typically placed in a tray or on a sheet. If thicker quantities of resin are attempted, then the UV light cures an unwanted shell at the top surface of the liquid resin, and this shell prevents UV rays from curing the trapped liquid resin underneath. Labor is needed to stir partially-cured resin to continually reveal uncured underlayers. This painstaking process then needs to be repeated until the material is completely cured, but constantly monitoring the work tray for proper thickness and curing, and possibly stirring the material, is labor-intensive. The process is also messy and hazardous, as the person processing the resin is exposed to outgassing fumes generated by the conversion of liquid resin to solid plastic.

Therefore, there is a need for an automated process for curing or hardening waste resin, such that the hardened resin can be innocuously disposed of in conventional waste. The process should require no labor, thus reducing labor costs and reducing the operator's exposure to toxic waste resin. Further, the process should consistently convert liquid waste resin to a safe solid state. Optionally, the process should have no pumps or shower head type orifices that tend to clog or generate unwanted stalactites, which can impede operation.

SUMMARY

The invention disclosed herein is an apparatus for hardening waste resin. The apparatus includes a container for holding the waste resin, the container having an outlet. The apparatus may also have a container pivot about which the container may rotate to a tilt position that allows waste resin to flow out of the outlet under the force of gravity, over a comb with a plurality of teeth. The teeth are constructed to separate the waste resin into waste resin droplets under the force of gravity. A conveyor surface is positioned below the comb to receive the waste resin droplets and the conveyor surface moves as it receives the waste resin droplets. A plurality of UV lights is positioned to illuminate the conveyor surface and to cause the waste resin droplets thereon to harden.

The apparatus may include an electro-mechanical lock that, when actuated, locks the container in the tilt position. A capacity sensor that detects a thickness of the hardened resin droplets on the conveyor surface may also be included. That capacity sensor, along with the electro-mechanical lock, may be connected to a processor, wherein the processor may perform the following steps: (a) receive data from sensor regarding the thickness of the hardened resin droplets on the conveyor surface; and (b) actuate the electro-mechanical lock when the sensor data is below a preset threshold.

The container may be removable from the apparatus, and its outlet may also include a slot constructed to regulate the flow of the waste resin out of the container. The container may also include a damper connected to it that slows the movement of the container from the tilt position to a non-tilt position.

To optimize the droplet formation of the waste resin, the tooth pitch is preferably in the range of 3 to 10 teeth per inch. Also, each tooth in the plurality of teeth preferably has a length of at least 0.25 inches.

The apparatus may have a drum spindle, such that the conveyor surface is a drum positioned over the drum spindle. Alternatively, the apparatus may have at least two conveyor belt spindles, such that the conveyor surface is a conveyor belt positioned over the at least two conveyor belt spindles. Either the drum or the conveyor belt may be removable and may be made of cardboard, paper, plastic, metal or combinations thereof.

The apparatus may have a presence sensor to detect the proper placement of the conveyor surface. This presence sensor may be used to render the system inoperable when the conveyor surface is not detected, so as to avoid spilling hazardous waste resin.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 2B1 illustrates the removable container and the resin drop-inducing comb separated from the waste resin hardening apparatus.

FIG. 2B2 illustrates the resin drop-inducing comb with resin droplets formed off the individual teeth of the comb.

DETAILED DESCRIPTION OF EXAMPLE EMBODIMENTS

Figure 1:
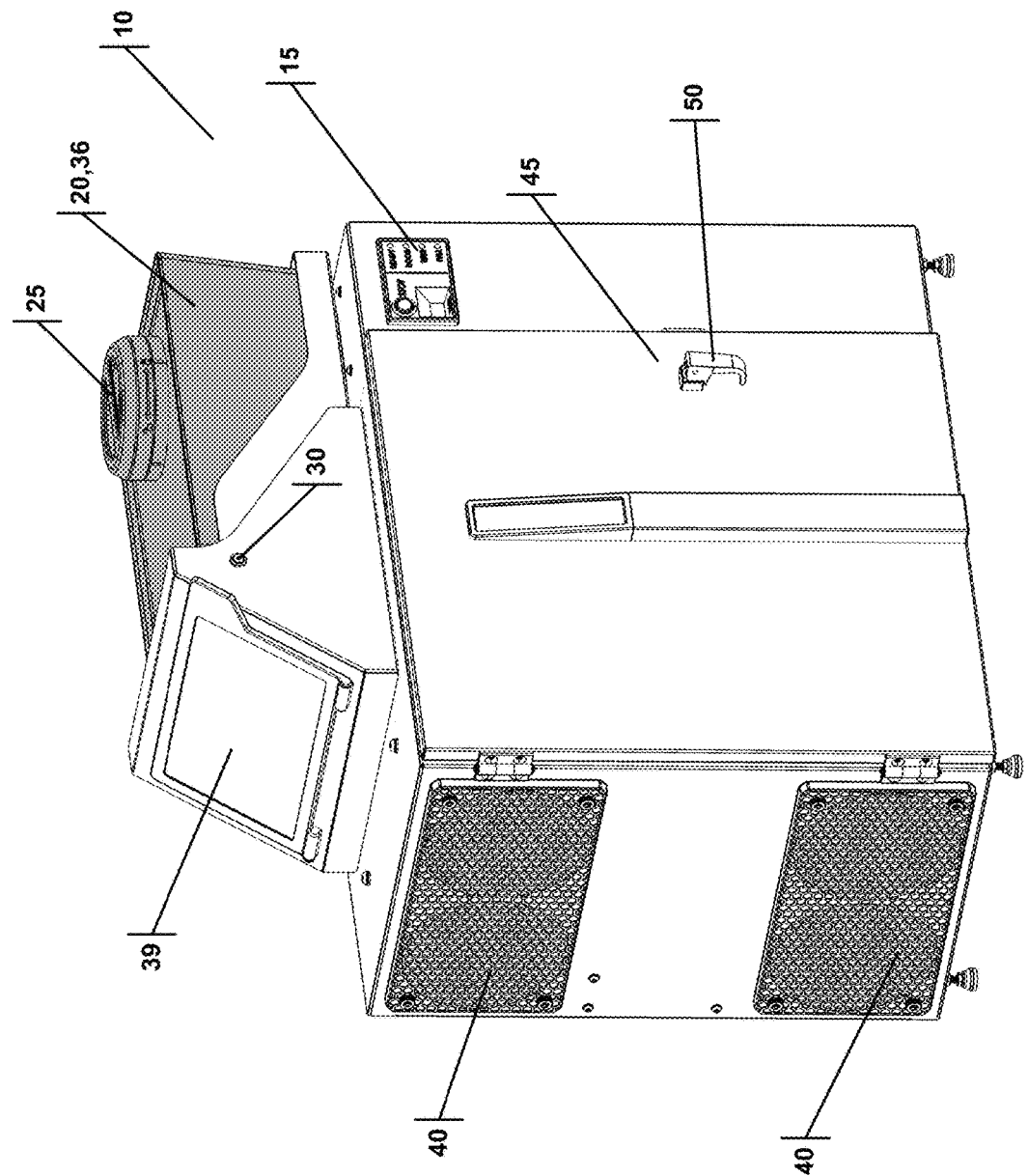
FIG. 1 illustrates a waste resin hardening apparatus in a perspective view.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

Waste Resin Hardening Apparatus 10
Control Panel 15
Removable Waste Resin Container (aka vat, hopper) 20
Container Lid 25
Container Lid Threaded Lock 27
Container Pivot 30
Container Tilt Support Bracket 31
Container Tilt Damper 32
Container Tilt Position 35
Container Non-Tilt Position 36
Electro-Mechanical Lock (To Maintain Tilt Position) 37
Electro-Mechanical Lock (To Maintain Non-Tilt Position) 38
Container Tray Latch 38-1
Comb Compartment Door 39
Air Exchange Fans with Carbon Filtration 40
Air Exchange Ports with Filtration 42
Induced Air Flow 43
Drum/UV Compartment Door 45
Drum/UV Compartment Door Latch 50
Drum/UV Compartment Door Latch Sensor 52
Drop-Inducing Comb 55
Resin-Catch Basin 60
Flow Regulating Slot 65
Comb Teeth 70
Comb Teeth Pitch 75
Comb Length 80
Comb Tooth Length 85
Resin Droplet Path 90
Resin Droplets 91
Drum (Conveyor Surface) 95
Drum Outer Surface 95-1
Drum Inner Surface 95-2
Drum Rotational Axis 96
Drum Rotational Plane 97
UV Lights 100
UV Light Guard 102
Drum Spindle 105
Drum Rotation Direction 110
Drum Spindle Support 115
Conveyor Belt (Conveyor Surface) 116
Conveyor Belt Outer Surface 116-1
Conveyor Belt Inner Surface 116-2
Conveyor Belt Spindles 117
Drum Presence Sensor 120
Drum Capacity Sensor 125
Processor 130

FIG. 1 illustrates an outside front perspective view of the waste resin hardening apparatus 10 of the present invention.

FIG. 1 shows a removable waste resin container 20 with a container lid 25 mounted to the top of the waste resin hardening apparatus 10. The apparatus 10 has a container pivot 30, about which the container 20 can rotate from the non-tilt position 36 to a tilt position 35 (shown in FIGS. 3A and 3B). The apparatus 10 may feature a control panel 15 on an outside wall. The apparatus may also feature air exchange fans with carbon filtration 40 along an outside wall, as well as a door 45 enclosing the drum 95 and/or the compartment containing UV lights 100 by way of a latch 50. Also, at the top the apparatus 10 may have a comb compartment door 39, which covers the resin drop-inducing comb 55, which is illustrated more clearly in FIG. 2A.

Figure 2A:
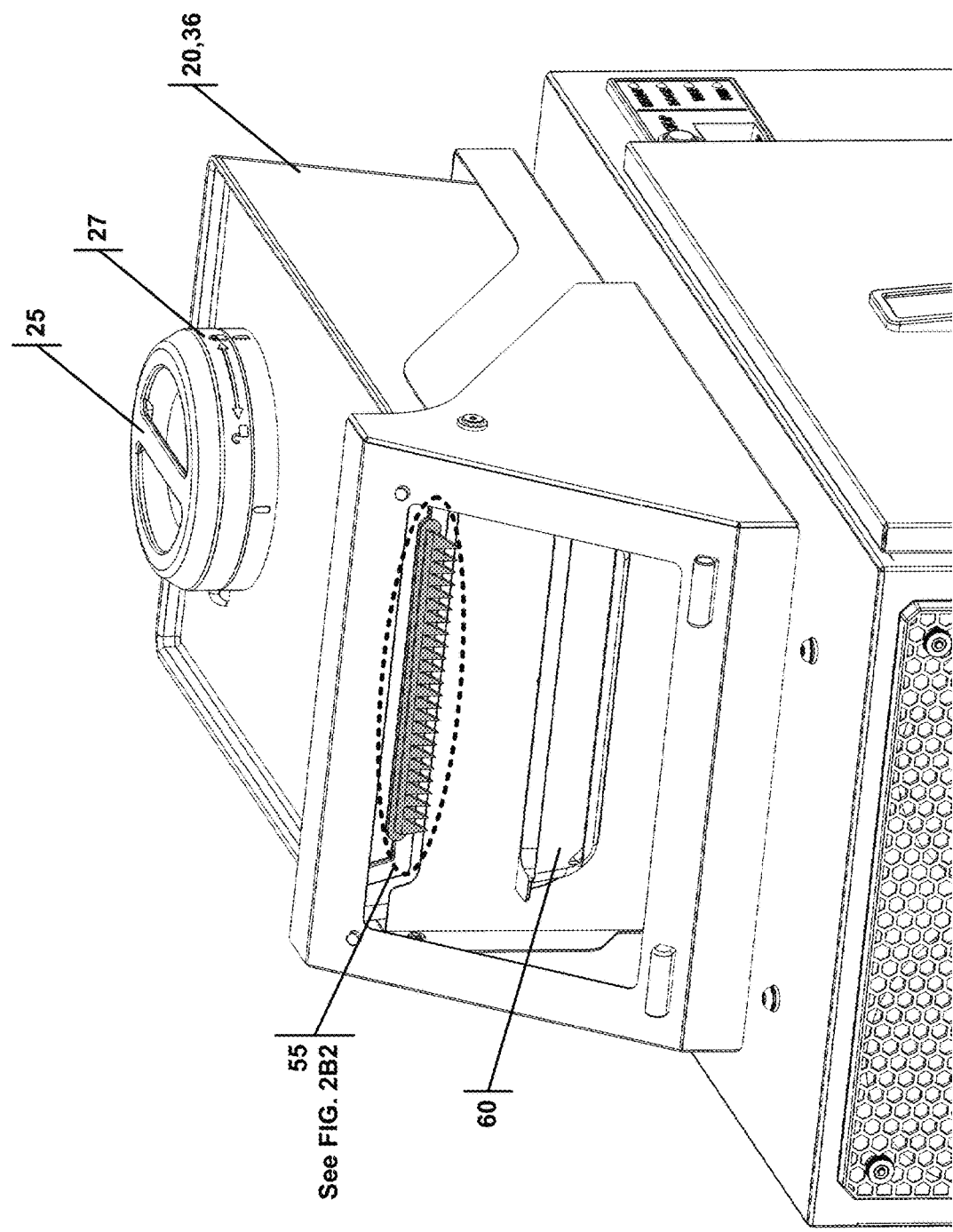
FIG. 2A illustrates the removable container and the resin drop-inducing comb of the waste resin hardening apparatus.
Figure 3B:
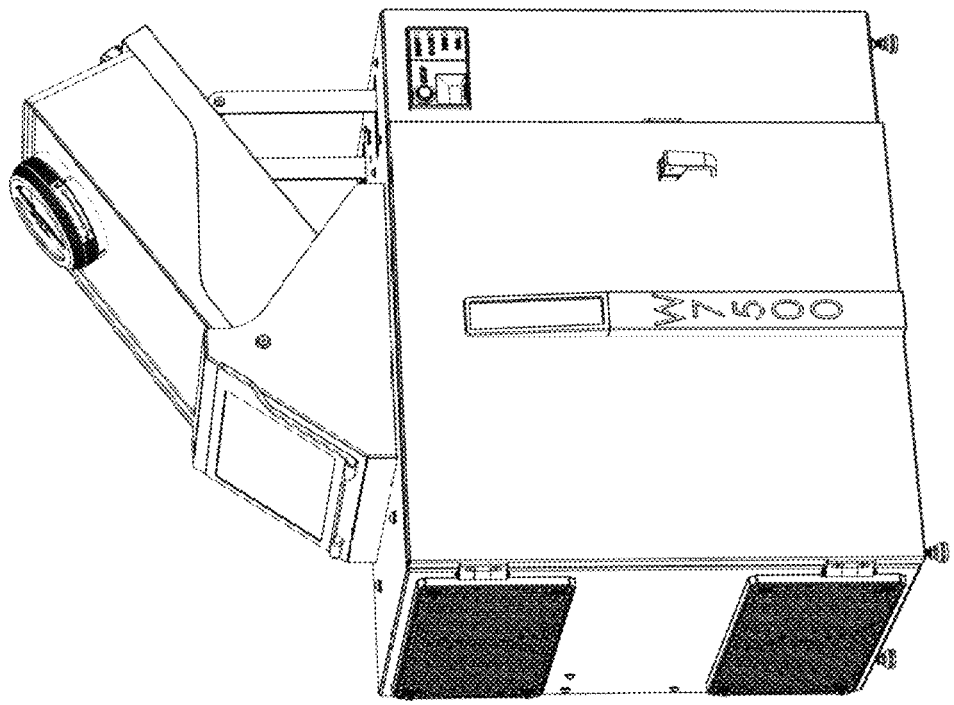
FIG. 3B illustrates the apparatus in the tilt position.
Figure 3A:
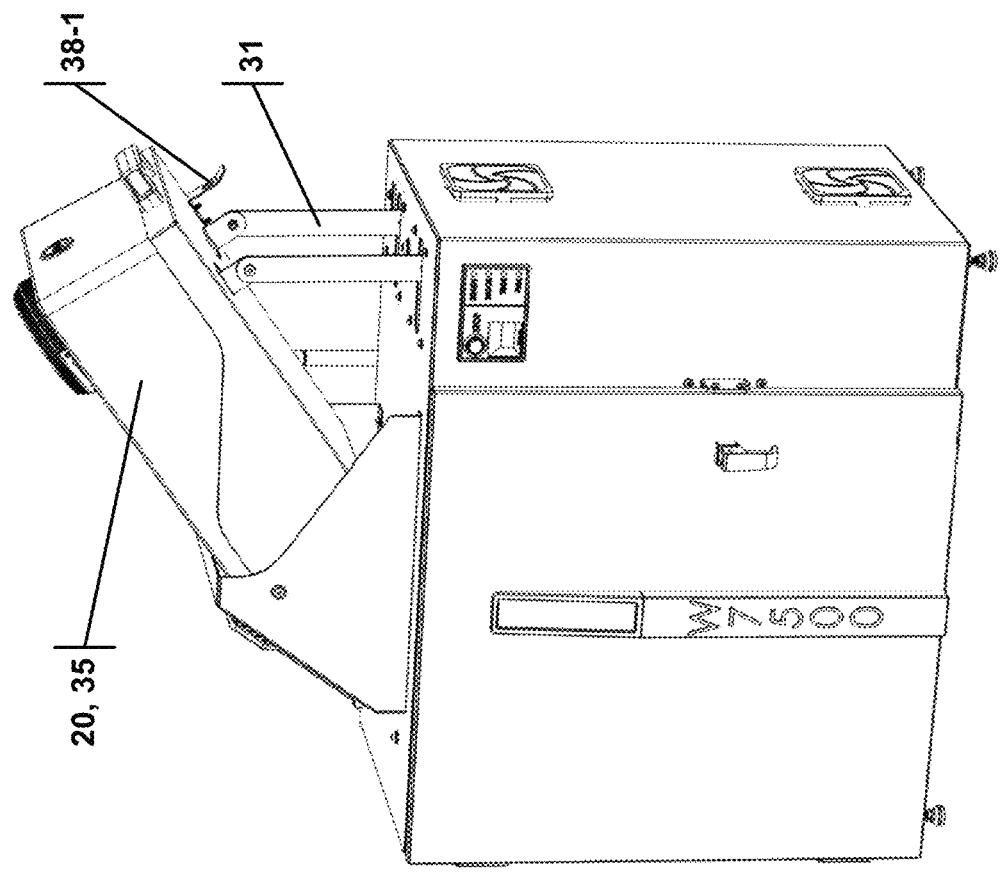
FIG. 3A illustrates the apparatus in the tilt position, including the container tray latch and the tilt support bracket.

Turning now to FIG. 2A, the removable waste resin container 20 is shown in a non-tilt position 36 in more detail. The container lid 25 has a threaded lock 27 so that the waste resin liquid poured into the container 20 will not splash out as the container 20 is tilted. Against a side of the container 20 is a container outlet 65 (delineated in FIG. 2B1), and a resin drop-inducing comb 55 along which the viscous waste resin may flow to form into droplets when the container 20 is tilted. Underneath the comb 55 is a resin-catch basin 60 to catch any uncured resin that may drip from the comb 55 when the container 20 is moved from the tilt position 35 back to the non-tilt position 36.

The purpose of the comb 55 is to form the uncured waste resin into appropriately sized droplets that can be cured quickly after exposure to UV light (more surface area so that the entire droplet is cured without forming underlayers that remain uncured, as with conventional methods of treating waste resin). In FIG. 2B1, it is shown that the comb teeth 70 can have a pitch 75, a comb teeth length 85, and a width that all impact the size of the droplets that results when the container 20 is tilted to have the waste resin contained within flow from the outlet or flow regulating slot 65 to the comb teeth 70. The particular parameters of the comb teeth 70 (i.e., pitch, length, width) may be changed based on the viscosity of the waste resin. The container 20 can be removed from the apparatus 10, and to switch between different resins having different viscosities, a new comb 55 may be switched and added to the container 20, and then the container may be loaded to the apparatus 10. The uncured waste resin form into droplets by gravity, needing no pumps, centrifugal force, nozzles, or orifices. This is shown in great detail in FIG. 2B2, where resin flowing as a sheet out of the slot 65 travels over the comb 55 and is formed into droplets 91 that fall by gravity in the direction of arrow 90. The comb teeth 70 separate the resin flow from the sheet into individual resin droplet streams, which provide a greater surface area exposure to the UV light—optimizing curing. In the apparatus 10 of the present invention, the waste resin need not be pure, and can be partially cured or contaminated, such that it cannot be pumped with conventional waste resin disposal methods, but it can still be safely cured and disposed of with the present invention.

Figure 4A:
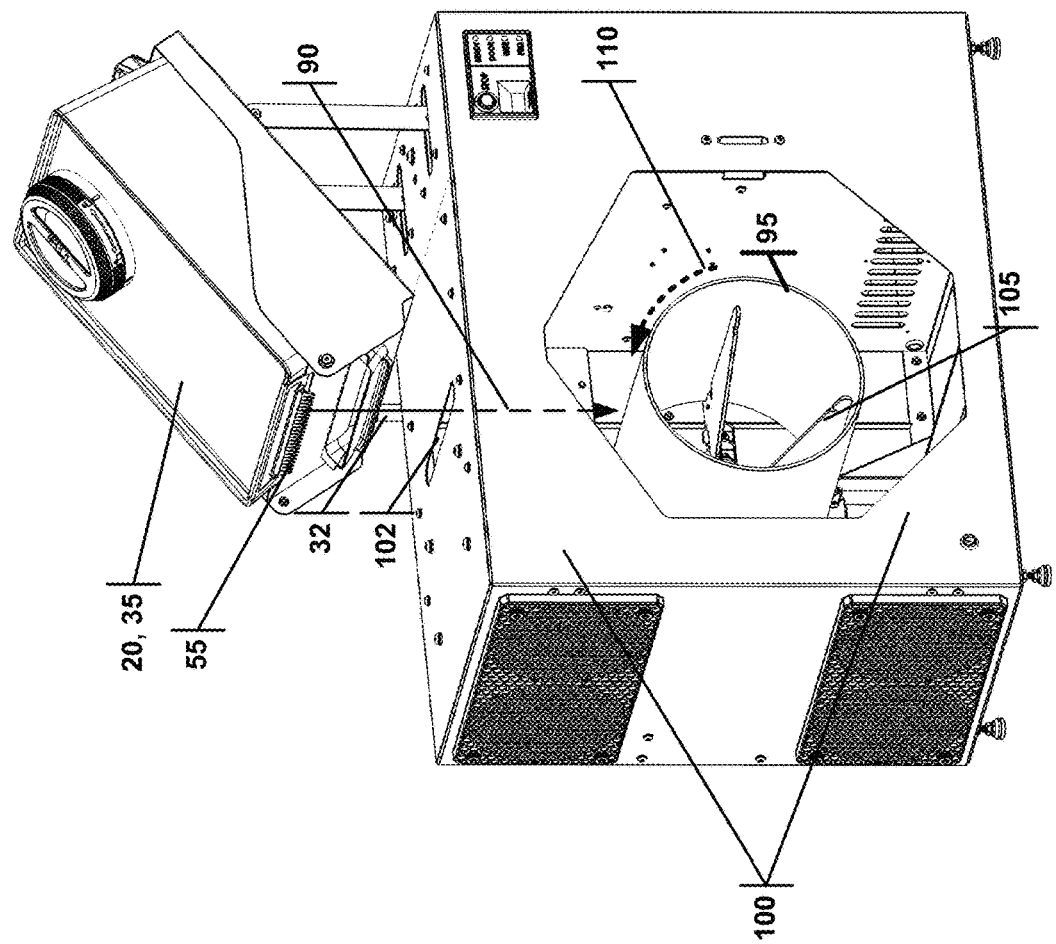
FIG. 4A illustrates the waste resin hardening apparatus that shows the resin droplet path and certain components.

Turning now to FIG. 4A, the means by which the waste resin hardening apparatus 10 operates is shown in its entirety. When the removable waste resin container 20 is in its tilt position 35, the waste resin flows from the outlet or flow regulating slot 65 to the resin drop-inducing comb 55, form into droplets, drop along the resin droplet path 90, and fall onto the surface of a rotating drum 95. UV lights 100 inside the apparatus 10 cure the resin droplets, and the drum 95 is rotated in the direction 110 by a drum spindle 105. The apparatus 10 for hardening waste resin may include: a container 20 for holding the waste resin, the container 20 comprising an outlet 65; a container pivot 30 about which the container 20 rotates to a tilt position 35 that allows the waste resin to flow out of the outlet 65 under the force of gravity; a comb 55 with a plurality of teeth 70 in fluid connection with the container outlet 65, wherein the teeth 70 are constructed to separate the waste resin flow from the container outlet 65 into waste resin droplets under the force of gravity; a drum spindle 105; a drum 95 over the drum spindle 105 that (a) is positioned below the comb 55 to receive the waste resin droplets, and (b) rotates 110 as it receives the waste resin droplets; and a plurality of UV lights 100 positioned to illuminate the drum 95 and to cause the waste resin droplets thereon to harden. The container 20 is removable from the apparatus 10. The outlet 65 comprises a slot constructed to regulate the flow of the waste resin out of the removable container 20.

Figure 4B:
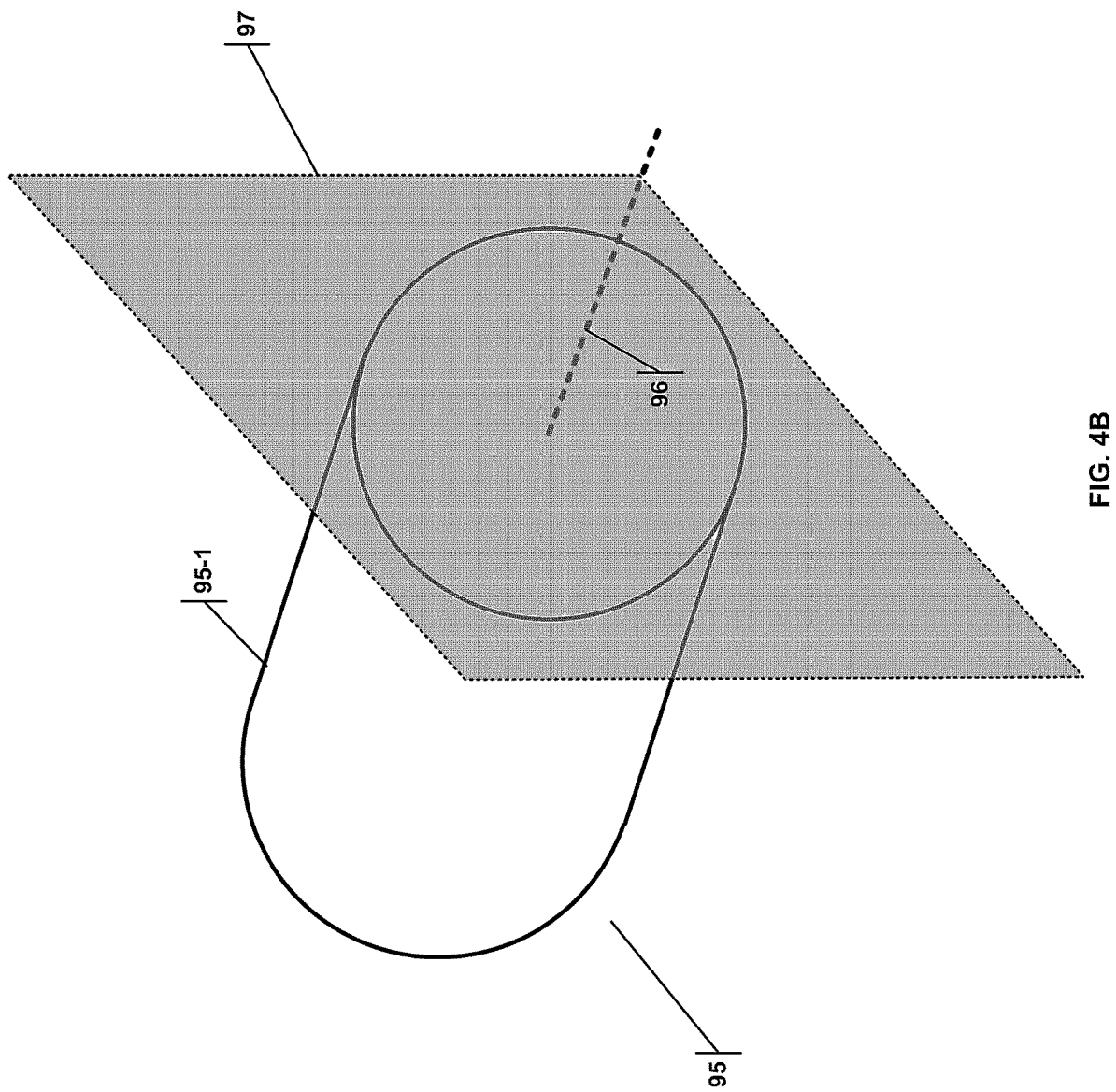
FIG. 4B illustrates the drum of FIG. 4A.

In FIG. 4B, the drum 95 is shown in more detail. The drum 95 rotates about an axis 96 and defines a rotational plane 97. The drum surface 95-1 that accepts the resin droplets is substantially orthogonal the rotational plane 97.

FIG. 4A also shows a UV light guard 102 that only allows the waste resin droplets to be illuminated as they are falling and prevents the UV light from illuminating the comb 55. The dimensions of the comb 55, the size of the opening in the UV light guard 102, and the tilt angle of the container 20 all contribute to the quantity of resin that will fall. It is important that these factors are balanced so that the droplets form at the right size, cure as they fall, are exposed to the UV light (consistent size allows for more consistent hardening as the droplets are cured by the UV light), and hit the drum surface. The UV lights 100 are positioned to start the curing/hardening process as soon as the droplets leave the comb 55, and the positioning of the UV illumination is of utmost importance. The UV illumination cannot hit the comb 55 because stalactites would then form. The UV lights 100 should illuminate the resin droplet path 90 so that the waste resin drops harden as they fall and not when in contact with the comb 55. Further assisting the waste resin droplets in hardening are the air exchange fans with carbon filtration 40 that induce an air flow 43 from the air exchange ports with filtration 42 (see FIG. 6B for illustration). The air flow 43 helps dry the resin, and the carbon filtration filters out toxic fumes from the resin.

Figure 3C:
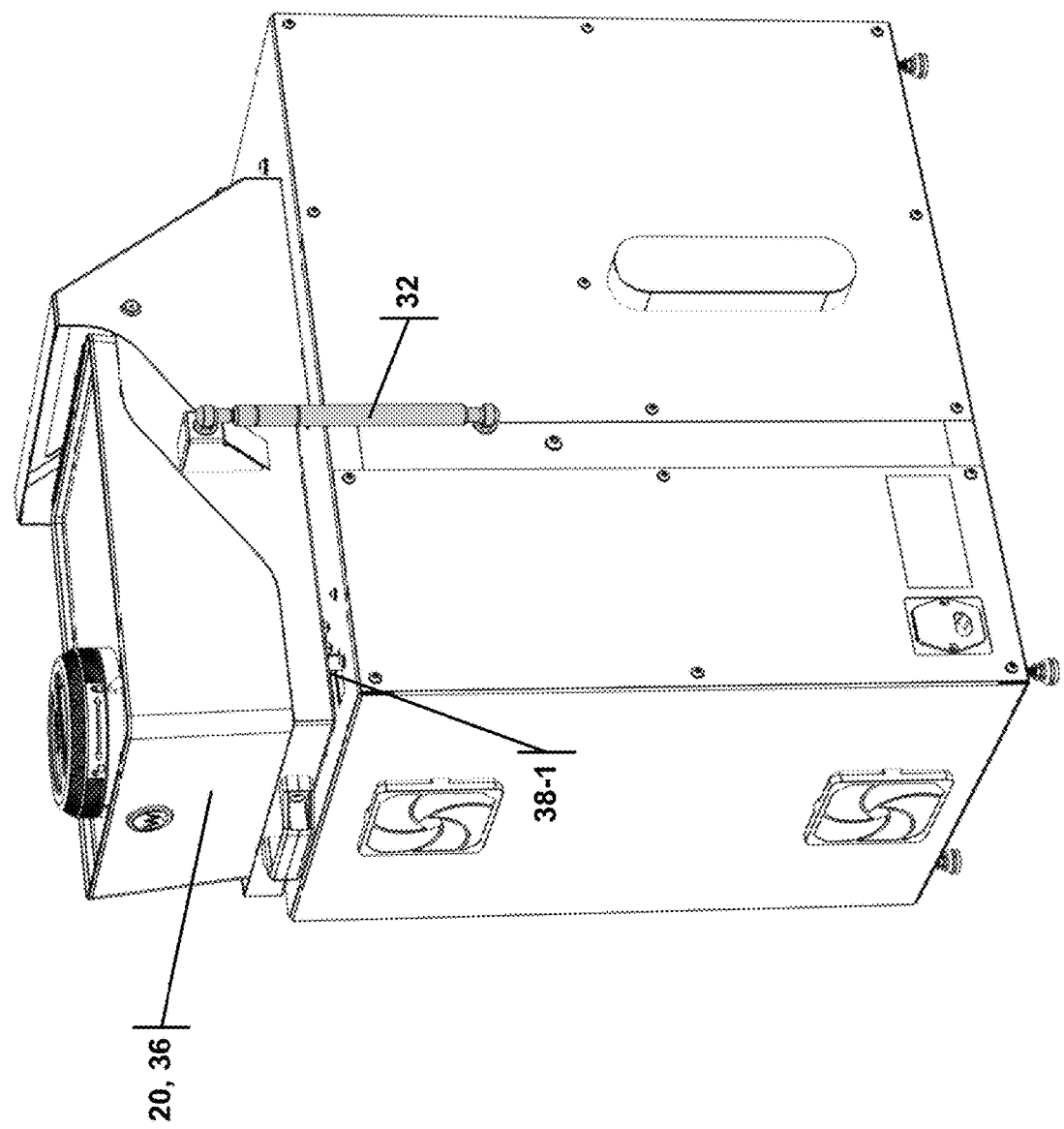
FIG. 3C illustrates the apparatus in the non-tilt position, including the tilt damper.

In order to automate the processing of the uncured liquid and hazardous waste resin into a cured, solid and non-hazardous form, the apparatus 10 could make use of actuators to transition between the tilt position 35 and the non-tilt position 36. Alternatively, this operation may be done manually by lifting the container 20 into the tile position 35. Turning back to FIGS. 3A-3C, the container 20 is shown in its tilt position 35 with a container tray latch 38-1 showing. The container 20 is securely supported by a container tilt support bracket 31. In the tilt position 35, the container tray latch 38-1 is open, and the waste resin hardening apparatus 10 may comprise a first electro-mechanical lock 37 (shown in FIG. 6D) that, when actuated, locks the container 20 in the tilt position 35. The electro-mechanical lock 37 may be an electromagnet and a plate or a solenoid that fixes the container 20 in the tilt position 35, such that the resin will flow due to gravity over the comb 55 onto the drum 95. If there is a power failure, the electro-mechanical lock 37 will become unactuated and will allow the container 20 to return to the non-tilt position 36. This design prevents a hazardous spill in case of power failure. Optionally, there is a second electro-mechanical lock 38 that may be a solenoid or electromagnet, which prevents the container from being lifted into the tilt position 35. The second electro-mechanical lock 38 fixes the container tray latch 38-1 (FIG. 3C) and maintains the container 20 in the non-tilt position 36. The second electro-mechanical lock 38 (FIG. 6C) may work in conjunction with other sensors such as a drum presence sensor 120 (FIG. 6A) or a drum/UV compartment door latch sensor 52, so that the container 20 cannot be in the tilt position 35 and cause a hazardous spill when the compartment door 45 is open or if there is no drum 95 in place to catch the droplets. Additionally, to ensure a smooth transition between positions and to dampen sudden movements that could result in a splash or spill, the waste resin hardening apparatus 10 may comprise a damper 32 (FIGS. 3C, 4, 6D) constructed to slow and smooth the movement of the container 20 from the tilt position 35 to a non-tilt position 36.

Figure 5A:
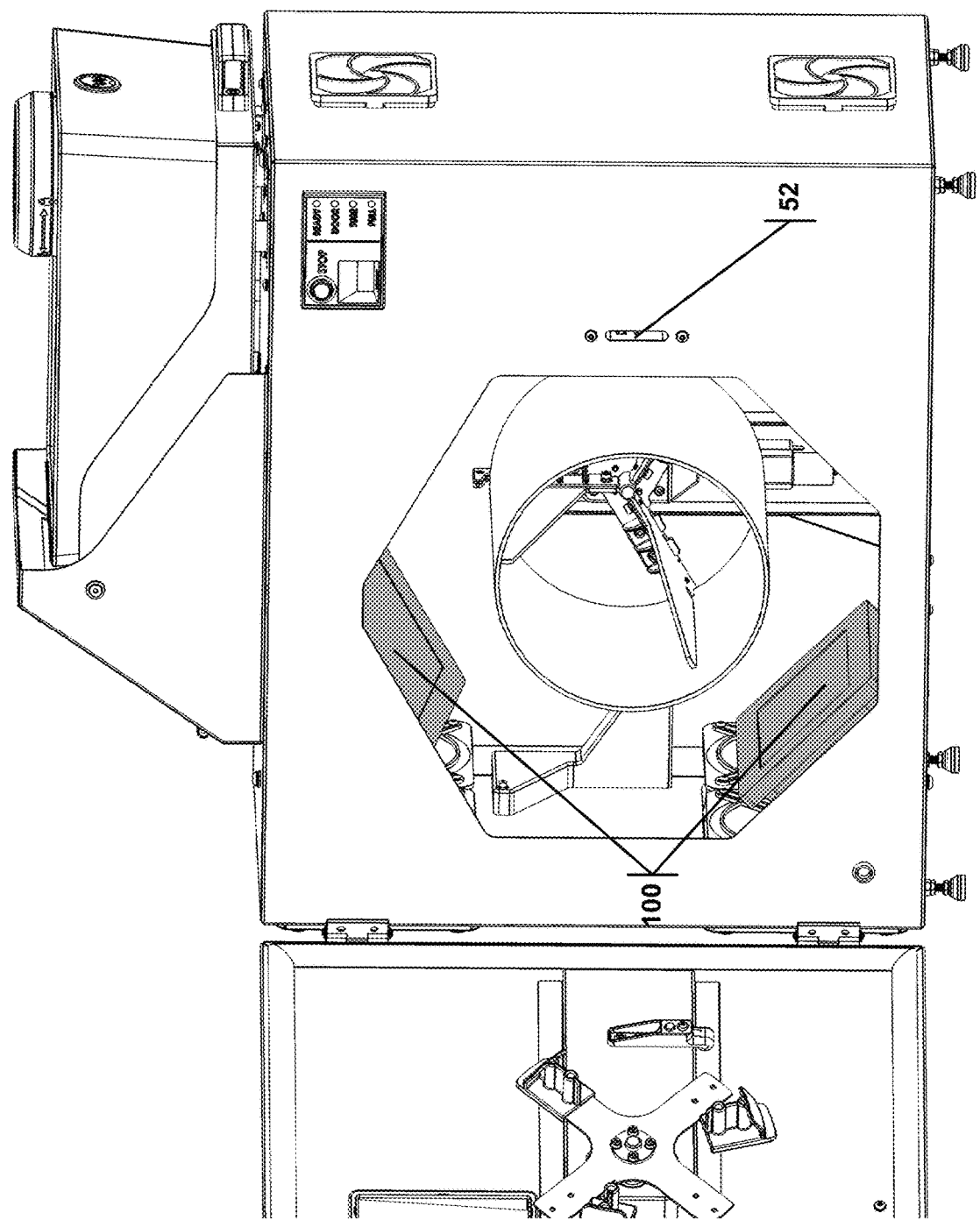
FIG. 5A illustrates the UV lights within the waste resin hardening apparatus.
Figure 5B:
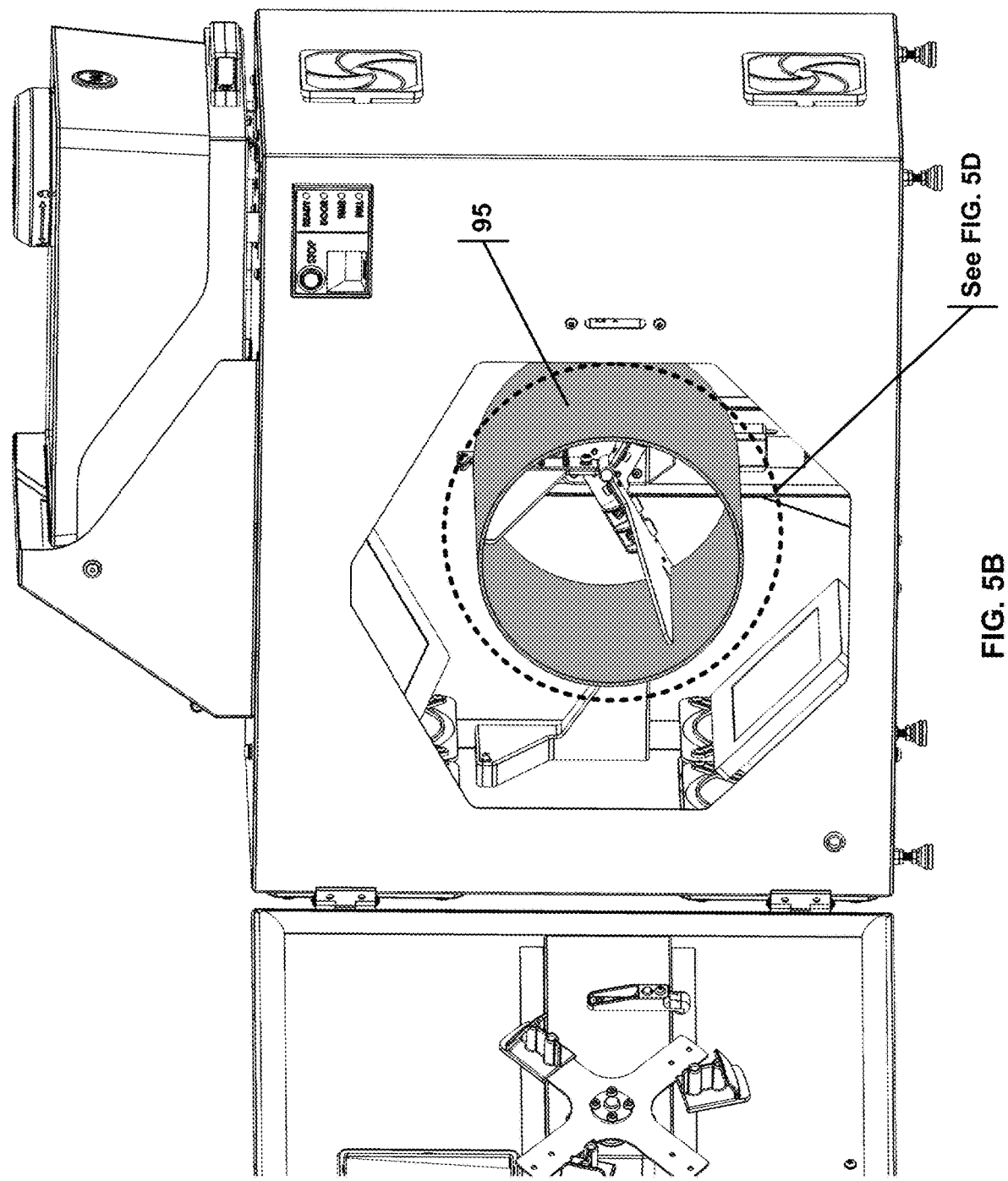
FIG. 5B illustrates the drum within the waste resin hardening apparatus.
Figure 5C:
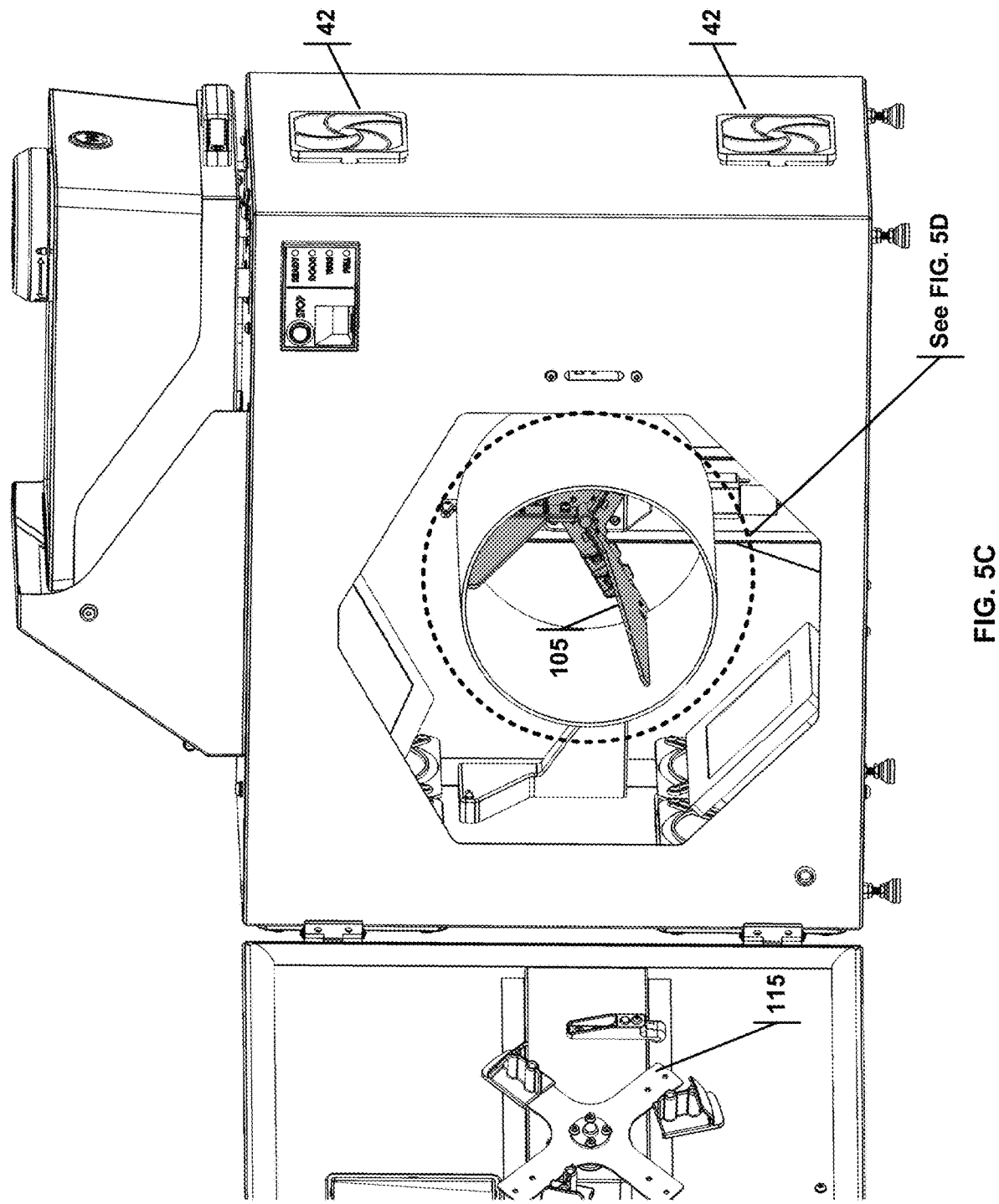
FIG. 5C illustrates the drum spindle and drum spindle support within the waste resin hardening apparatus.

FIG. 5A provides one possible arrangement for the positioning of the UV lights 100 within the waste resin hardening apparatus 10, as well as the relative positioning of the drum/UV compartment door latch sensor 52. FIG. 5B delineates the drum 95 inside the apparatus 10, and FIG. 5C further shows the drum spindle 105 and the drum spindle support 115. It is worthwhile to note that the drum 95 is removable and may be comprised of cardboard, paper, plastic, metal, or combinations thereof. The removeable drum 95 may be simply a disposable substrate that can be rotated to catch the waste resin droplets, which then may be disposed of as a solid waste Itself. Alternatively, the removeable drum 95 and the resin droplets that form on its surface may be used as a decorative material with a uniquely textured surface, such as for home decor or for planters, or the finished removable drum 95 with the solid resin droplets could be used as a raw material for CNC machining activities. In order to process the waste resin and to produce more unique textures and patterns, the waste resin hardening apparatus may further comprise additional actuators that move the drum spindle 105, and consequently the drum 95, in a direction substantially orthogonal to the plane of rotation of the drum 95, thereby gaining the capability to create artistic two-dimensional designs or patterns with the waste resin droplets that form on the surface of the removable drum 95.

Figure 6A:
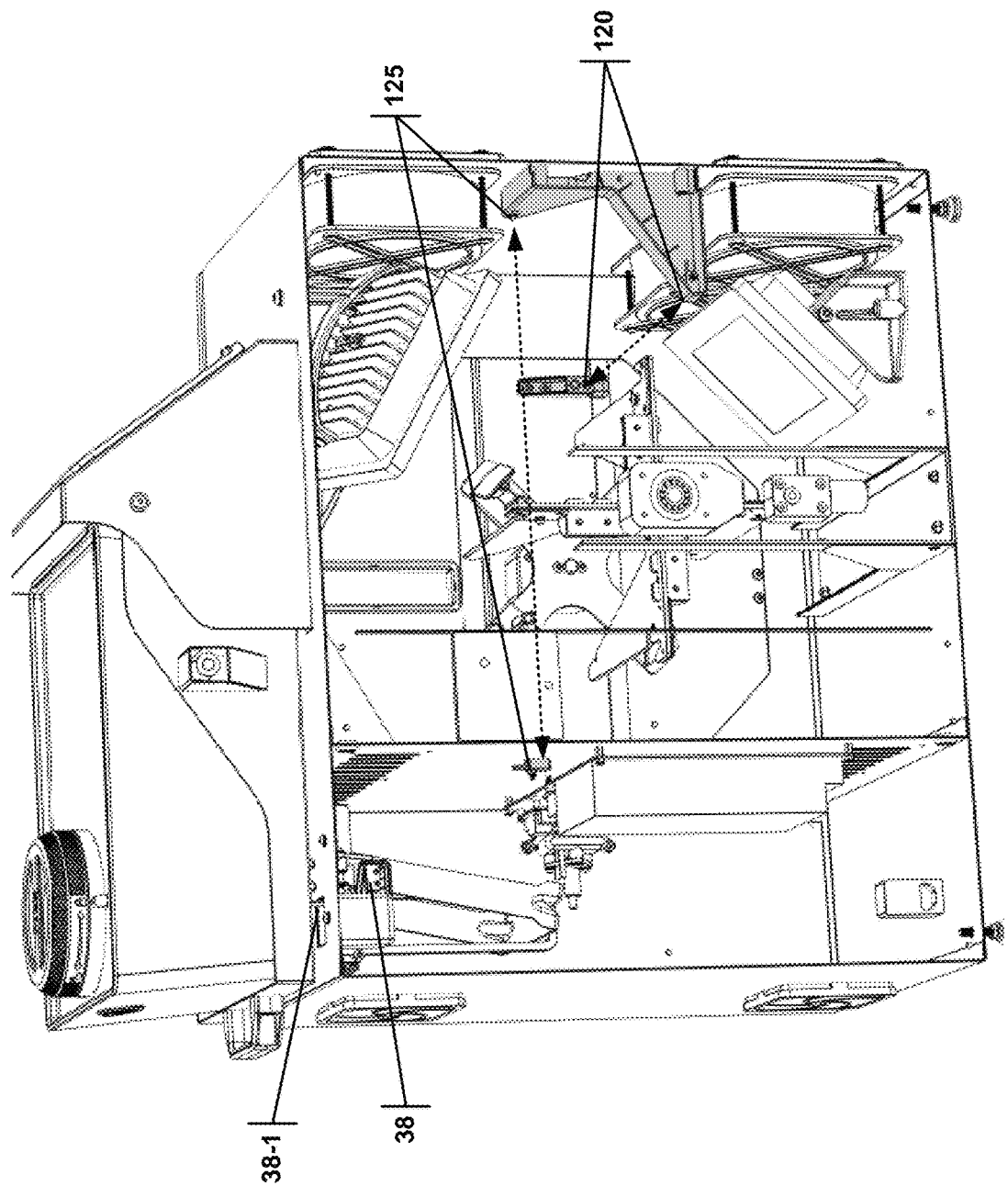
FIG. 6A illustrates the drum presence and drum capacity sensors, as well as the non-tilt position lock.

As a way to automatically control the thickness of hardened resin that may form on the drum 95, and to stop the process at an appropriate level, the apparatus 10 of the present invention can make use of a processor 130 and a capacity sensor 125 to determine when the electro-mechanical lock 37 should be actuated to enable the waste resin to drip onto the drum 95. FIG. 6A illustrates thru-beam pairs of sensors to detect the drum capacity and the drum presence. Of course, the drum presence sensors 120 and/or the drum capacity sensors 125 need not be of a thru-beam design, and may be for example a type of sensor that is able to detect a reflected signal. The drum capacity may be determined by resin thickness (e.g., a threshold thickness the drum surface or substrate can support the weight of the waste resin, or a thickness that would not interfere with normal operation of the apparatus 10. Thickness can also be detected using appropriately positioned photovoltaic sensors, photovoltaic arrays, CCD/camera, etc. Alternatively, drum capacity does not necessarily have to reflect the thickness of the solid resin formed on the drum, but can instead refer to percent coverage of the drum surface. A photovoltaic array or CCD or camera may be positioned relative to the UV lights 100, such that UV light can reflect to the capacity sensors off of the waste resin droplets, and the position of the capacity sensors does not block UV light from reaching drum surface.

Figure 7:
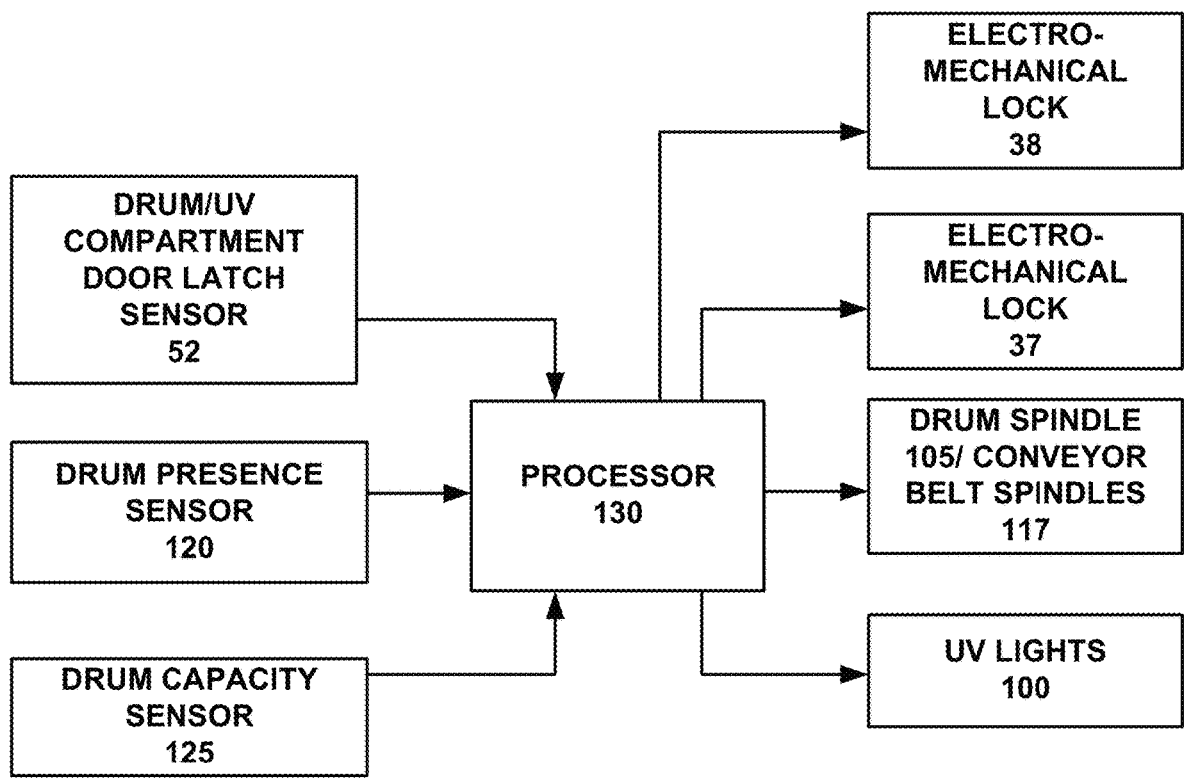
FIG. 7 is a schematic of the sensors and other components that are connected to and controlled by a processor.

As illustrated in FIG. 6A and FIG. 7, the waste resin hardening apparatus 10 may comprise a capacity sensor 125, which detects a thickness of the hardened resin droplets on the drum 95, and a processor 130 connected to the capacity sensor 125 and the first electro-mechanical lock 37. The processor 130 is constructed to perform the following steps: (a) receive data from the capacity sensor 125 regarding the thickness of the hardened resin droplets on the drum 95; and (b) actuate the electro-mechanical lock 37 when the sensor data is below a preset threshold. When the electro-mechanical lock 37 is actuated, the container 20 is in the tilt position 35, and the apparatus 10 can operate until the drum capacity reaches the preset threshold. This preset threshold may be varied by an operator in accordance with the drum material and specifications. Once the capacity reaches the preset threshold, the electro-mechanical lock 37 is deactivated, and the container 20 returned to the non-tilt position 36.

Figure 6B:
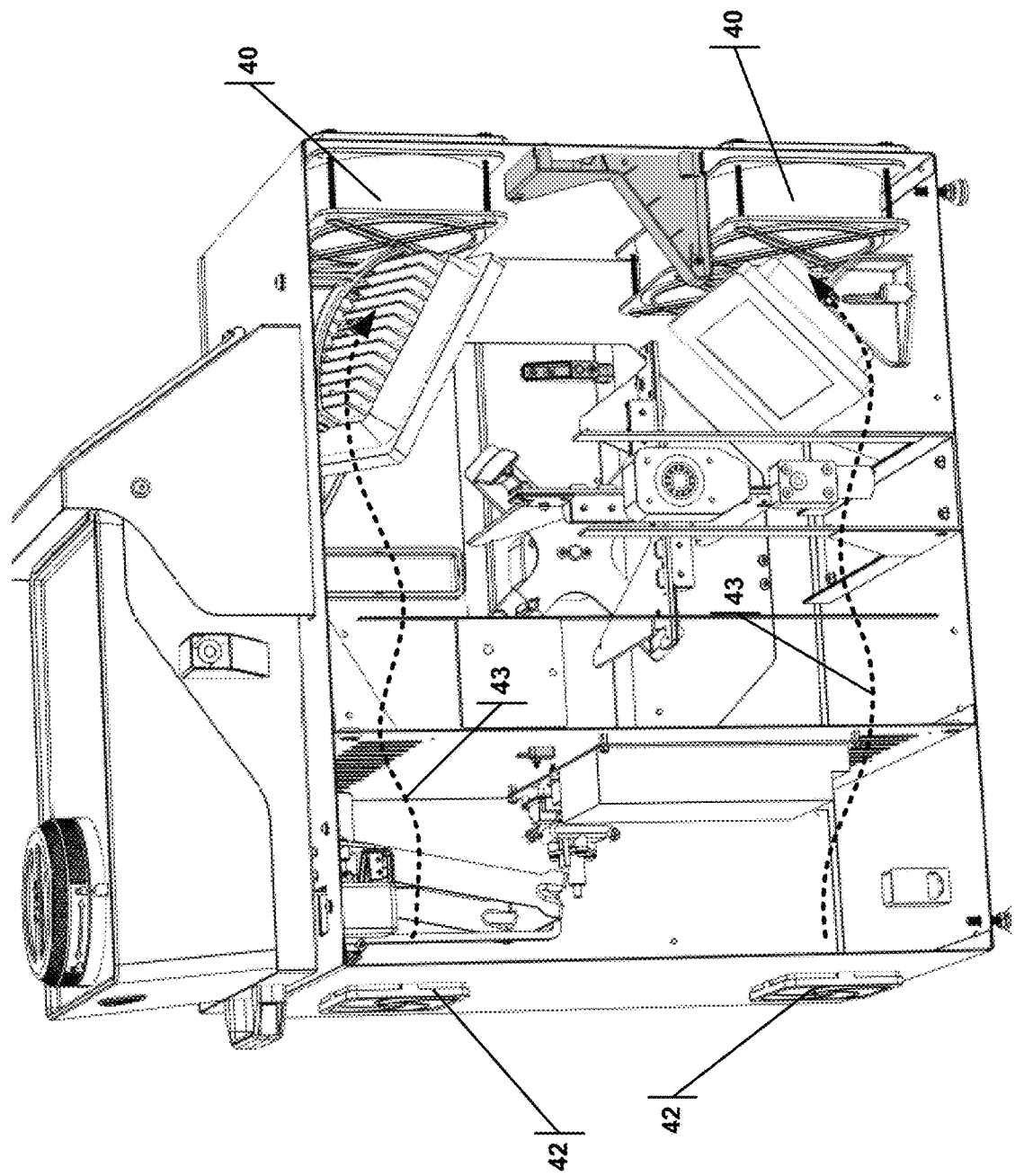
FIG. 6B illustrates the airflow within the apparatus.
Figure 6C:
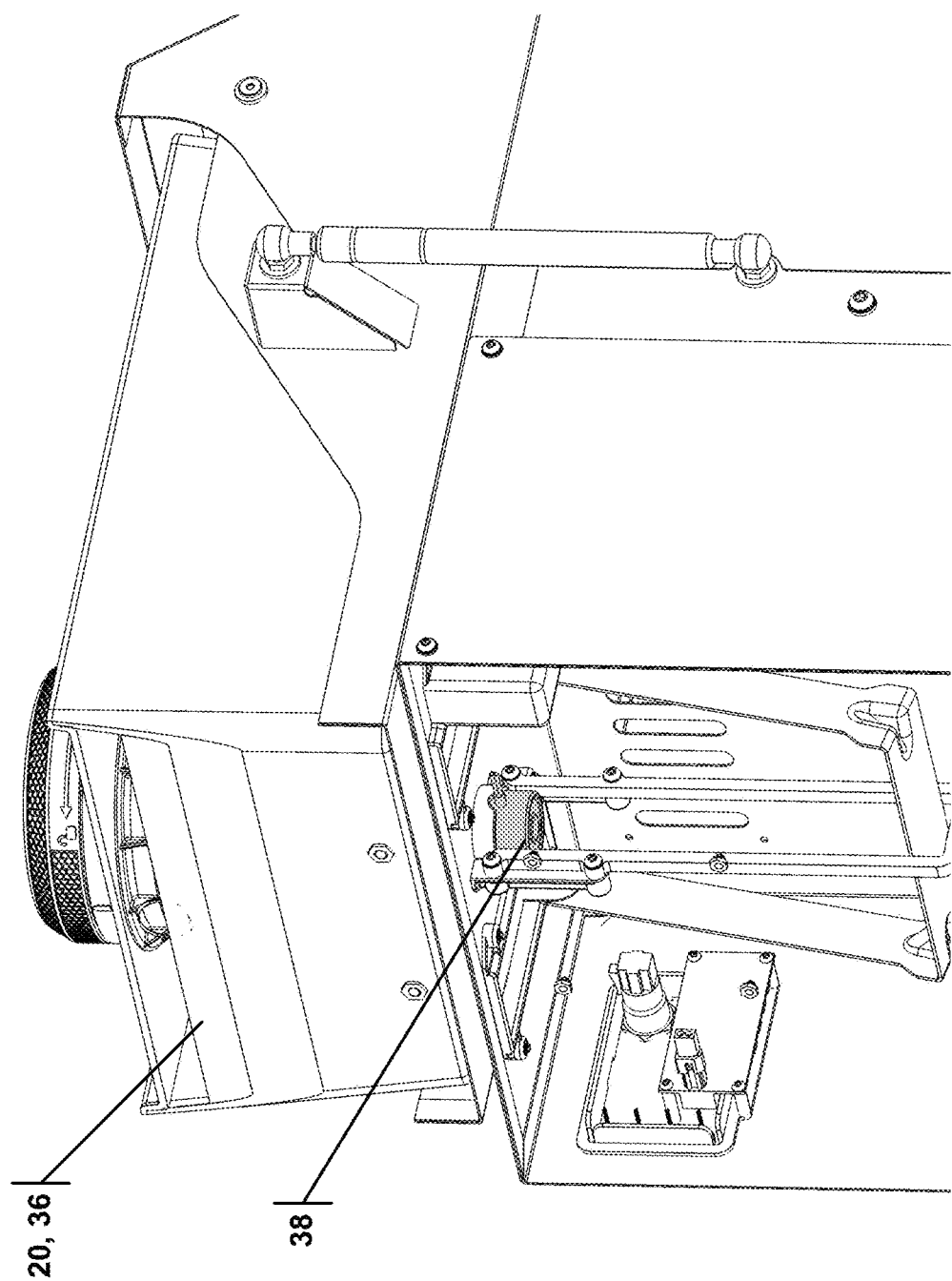
FIG. 6C illustrates the non-tilt position lock.
Figure 6D:
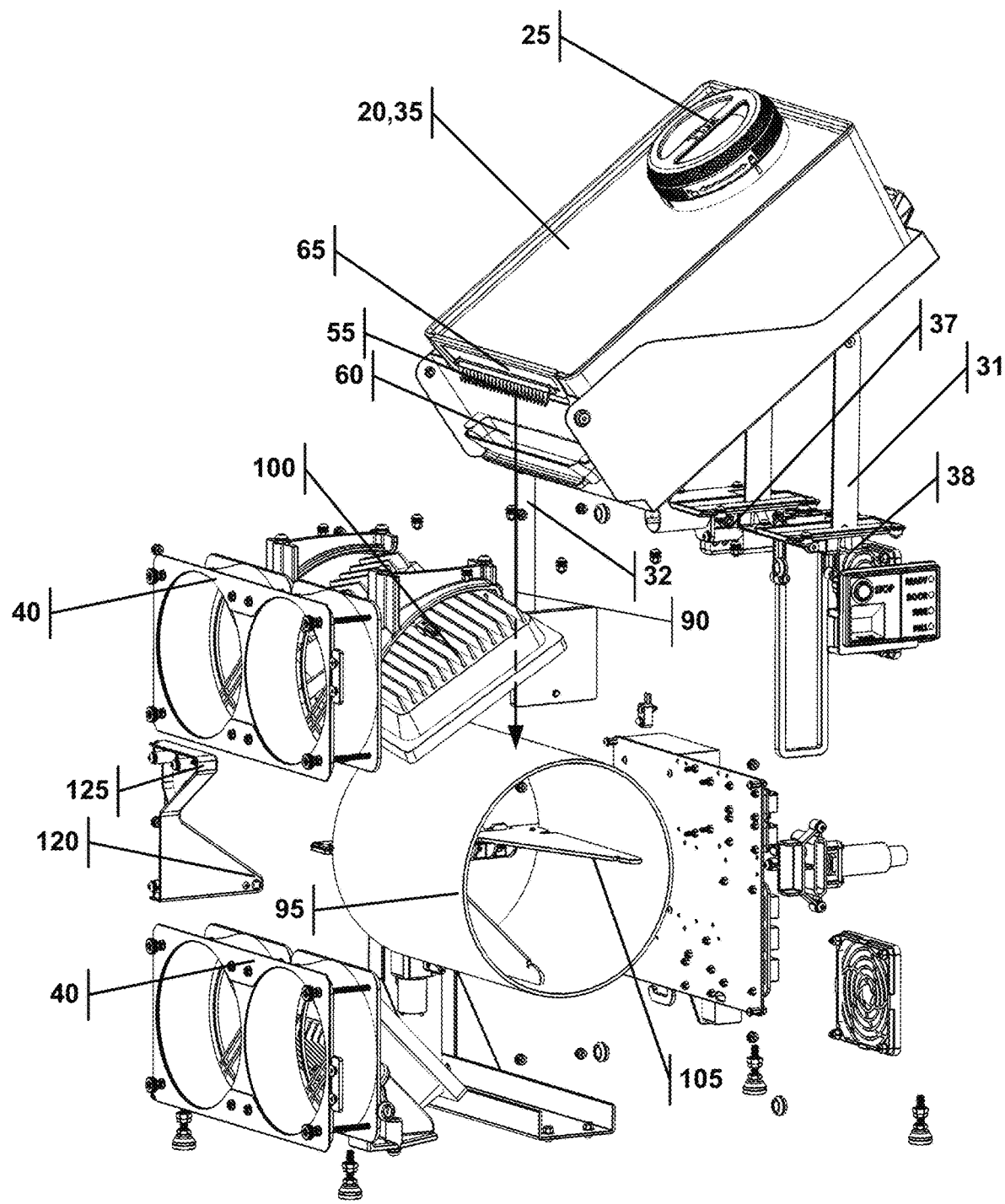
FIG. 6D illustrates an exploded view of an embodiment of the present invention.

FIG. 6D is an exploded view of an embodiment of the apparatus 10, as was described above. The apparatus 10 comprises a removable waste resin container 20 in the tilt position 35, having a container lid 25, an outlet or flow regulating slot 65, a resin drop-inducing comb 55, and a resin-catch basin 60 to catch drips from the comb 55 in the non-tilt position 36 (not shown). To maintain the container 20 in the tilt position 35, there is a container tilt support bracket 31 and a first electro-mechanical lock 37 that is actuated, while a second electro-mechanical lock 38, which would maintain the container 20 in a non-tilt position 36, is unactuated. There is a container tilt damper 32 to dampen sudden movements when the container 20 is transitioning positions and to prevent unwanted splashes and spills that could occur with sudden movements. A top panel of the apparatus 10 (not shown) would have served as a UV light guard 102 to prevent the UV illumination from the UV lights 100 from reaching the comb 55 and causing stalactites. The UV lights 100 are instead directed at the falling waste resin droplets, which fall from the comb 55 to the drum 95, and are cured/hardened by the UV illumination. A drum spindle 105 rotates the drum 95, a drum presence sensor 120 detects the presence of the drum 95, and a drum capacity sensor 125 detects the capacity of the drum 95. To further assist the hardening of the waste resin while filtering out toxic gases that may result, air exchange fans with carbon filtration 40 induce an air flow 43 from the air exchange ports 42 (FIG. 6B).

Figure 5D:
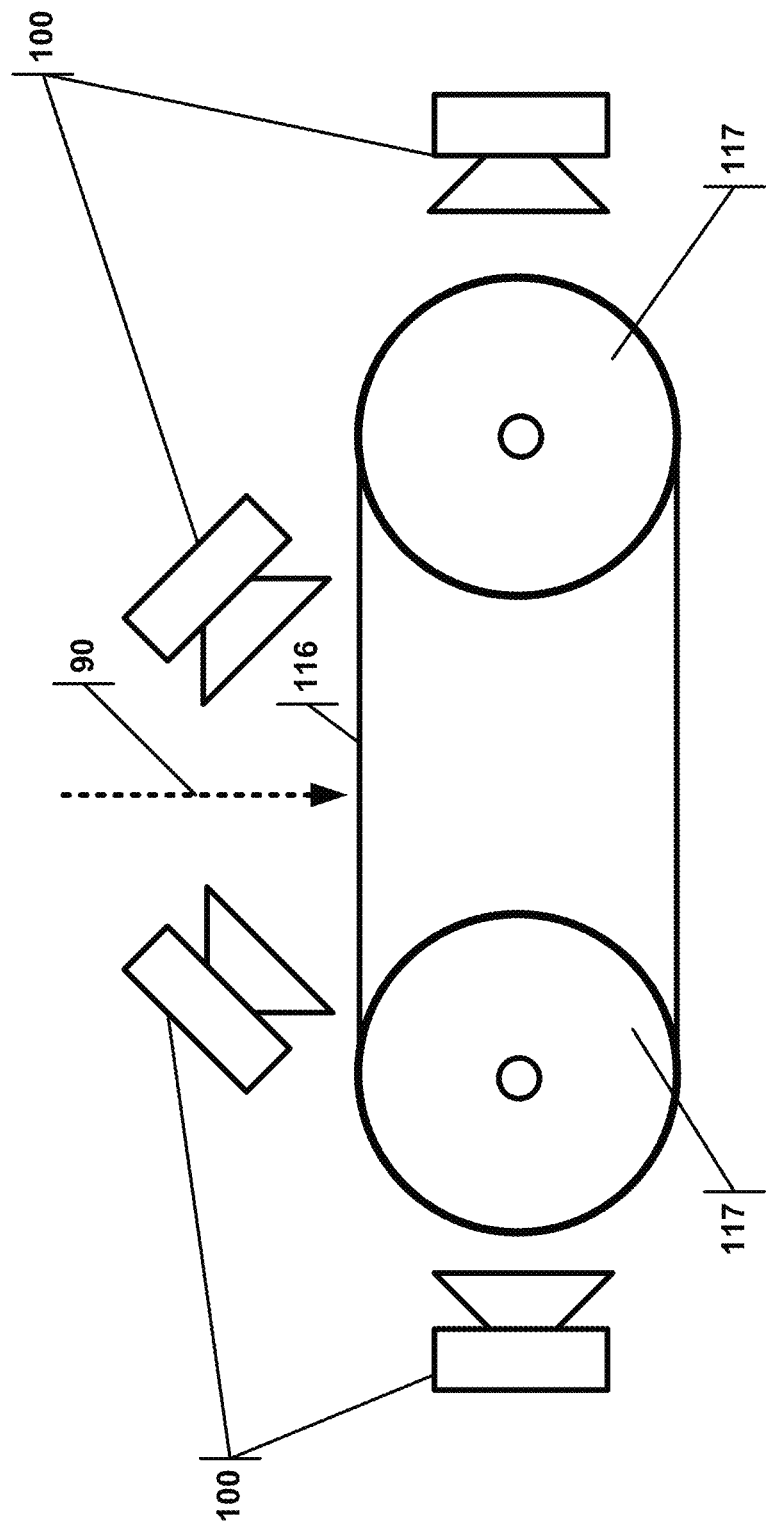
FIG. 5D illustrates a conveyor belt alternative to the drum.
Figure 5E:
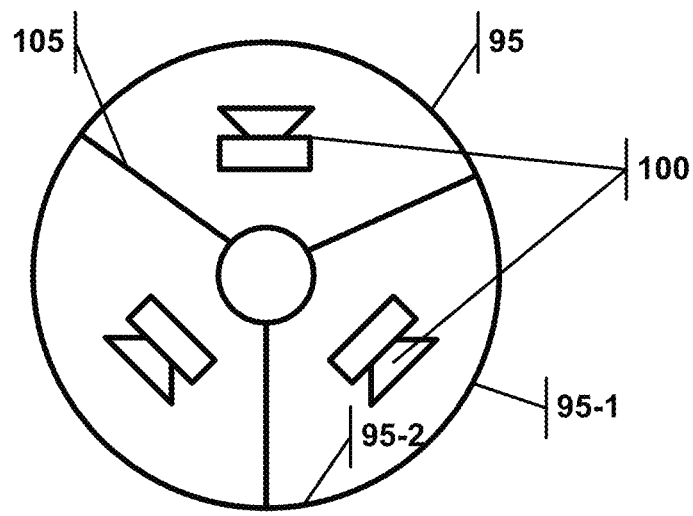
FIG. 5E illustrates an embodiment where the drum is made of a material that is transparent to UV light, such that UV light may be positioned to shine on the inner surface of the drum, further assisting in hardening the resin.
Figure 5F:
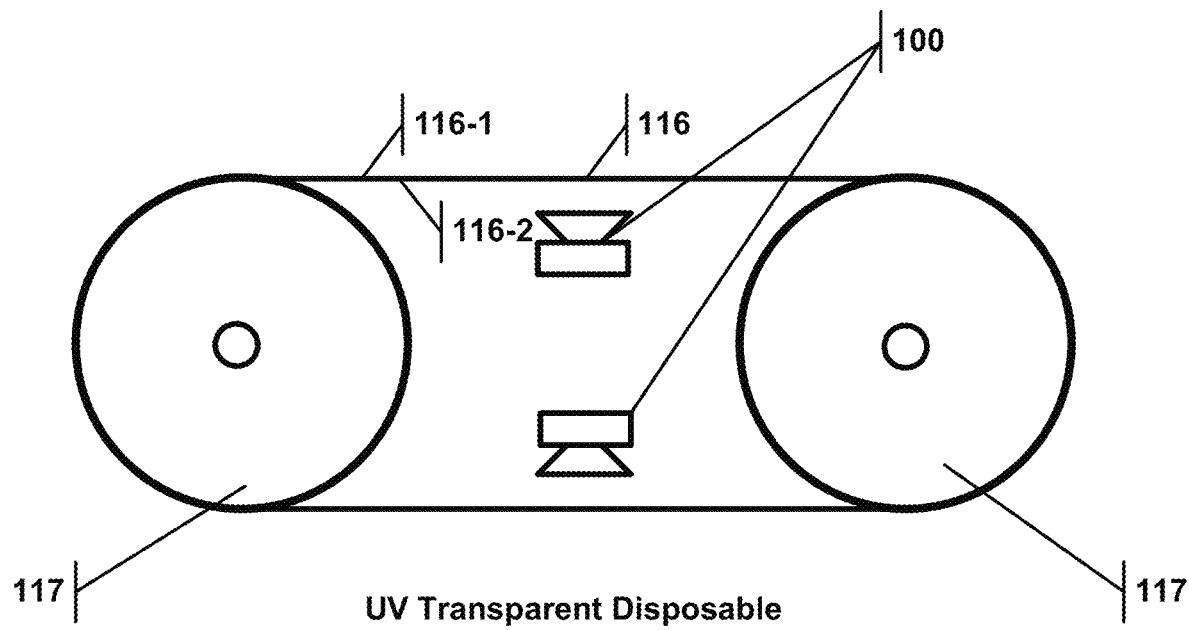
FIG. 5F illustrates an embodiment where the conveyor belt is made of a material that is transparent to UV light, such that UV light may be positioned to shine on the inner surface of the conveyor belt, further assisting in hardening the resin.

Although only the above embodiment was fully illustrated in perspective views, FIGS. 5D-5F provide schematic views of alternative embodiments. Instead of having a drum 95 inside the apparatus 10, the waste resin hardening apparatus 10 could instead use a conveyor belt 116 moved with the help of conveyor belt spindles 117, as shown in FIG. 5D. The UV lights 100 would be positioned around the conveyor belt 116 and illuminate the resin droplet path 90, thus curing the waste resin droplets that drop onto the conveyor belt 116 surface. One possible variation, shown in FIG. 5E, has a drum 95 comprising the conveyor belt 116, with an outer surface 95-1 and an inner surface 95-2. If the drum (95, 116) material is UV-transparent, then the UV lights 100 could be placed internally to the conveyor belt surface. The drum spindle 105 may be fixed relative to the UV light(s) 100, or the drum spindle 105 may have slots allowing the drum spindle 105 to rotate while the UV light(s) 100 remain fixed and illuminate a rotating surface. If the material is UV-transparent, then the UV illumination is upon the drum inner surface 95-2, but penetrate through to the drum outer surface 95-1 and cure the resin droplets on the drum outer surface 95-1. FIG. 5F likewise shows the setup for the UV lights 100 illuminating an inner surface 116-2 and penetrating through to the outer surface 116-1, but this drawing shows two conveyor belt spindles 117 rotating the conveyor belt 116.

An general alternate embodiment of an apparatus 10 for hardening waste resin thus comprises: a container 20 for holding the waste resin, the container 20 comprising an outlet constructed to allow the waste resin to flow out of the container 20; a comb 55 with a plurality of teeth 70 in fluid connection with the container outlet 65, wherein the teeth 70 are constructed to separate the waste resin flow from the container outlet 65 into waste resin droplets under the force of gravity. In the alternative, the container (20) may instead be a waste resin source that feeds the waste resin directly over the comb (55), thus creating the waste resin droplets. A conveyor surface (95, 116) that (a) is positioned below the comb 55 to receive the waste resin droplets, and (b) moves 110 as it receives the waste resin droplets; as well as a UV light 100 positioned to illuminate the conveyor surface (95, 116) and to cause the waste resin droplets thereon to harden. The UV light 100 of the apparatus 10 may comprise a plurality of UV lights illuminating different portions of the conveyor surface (95, 116). In one aspect, the apparatus 10 comprises a drum spindle 105, wherein the conveyor surface 95 comprises a drum positioned over the drum spindle 105. The drum 95 is removable and comprised of cardboard, paper, plastic, metal, or combinations thereof. In another aspect, the apparatus 10 comprises at least two conveyor belt spindles 117, wherein the conveyor surface 116 comprises a conveyor belt 116 positioned over the at least two conveyor belt spindles 117. The conveyor belt 116 may be removable and comprised of cardboard, paper, plastic, metal, or combinations thereof. The container 20 may be removable from the apparatus 10. The apparatus 10 may comprise a container pivot 30 about which the container 20 rotates to a tilt position 35 that allows waste resin to flow out of the outlet 65 under the force of gravity. The apparatus 10 may comprise a damper 32 constructed to slow and smooth the movement of the container 20 from the tilt position 35 to a non-tilt position 36. The outlet 65 of the container 20 of the apparatus 10 may comprise a slot constructed to regulate the flow of the waste resin out of the container 20.

The apparatus 10 may comprise a capacity sensor 125 that detects a thickness of the hardened resin droplets on the conveyor surface (95, 116). The apparatus 10 may comprise a presence sensor 120 that detects a proper position of the conveyor surface (95, 116). The apparatus 10 may comprise a door latch sensor 52 that detects whether the conveyor (95, 116) compartment and/or the UV light 100 compartment door is open. The apparatus 10 may comprise a first electro-mechanical lock 37 that, when actuated, locks the container 20 in the tilt position 35. The apparatus 10 may comprise a second electro-mechanical lock 38 that, when actuated, locks the container 20 in the non-tilt position 36. The apparatus 10 may comprise a capacity sensor 125 that detects a thickness of the hardened resin droplets on the conveyor surface (95, 116) and a processor 130 connected to the sensor 125 and to the electro-mechanical lock 37, wherein the processor 130 is constructed to perform the following steps: (c) receive data from the sensor 125 regarding the thickness of the hardened resin droplets on the conveyor surface (95, 116); and (d) actuate the electro-mechanical lock 37 when the sensor data is below a preset threshold.

The apparatus 10 may comprise a processor 130 and a second electro-mechanical lock 38, wherein the processor 130 actuates the second electro-mechanical lock 38 to lock the container 20 in the non-tilt position 36 based on input from one or more sensors, including but not limited to: a conveyor presence sensor 120, and a compartment door sensor 52.

Illustrated in FIG. 7 are the various sensors that can provide inputs to the processor 130, as well as the various actuators and components of the apparatus 10 that may be controlled by the processor 130. There may be a drum/UV compartment door latch sensor 52, a drum presence sensor 120, and a drum capacity sensor 125, as well as a first electro-mechanical lock 37, a second electro-mechanical lock 38, a drum spindle 105 or a plurality of conveyor belt spindles 117, and a plurality of UV lights 100. The processor 130 may actuate the first electro-mechanical lock 37, the drum spindle 105 or the conveyor belt spindles 117, and the UV lights 100 when the apparatus 10 is operating in the tilt position 35, until such time that the drum capacity sensor 125 detects a preset threshold thickness of the resin on the drum or on the conveyor. The processor 130 may instead actuate the second electro-mechanical lock 38 if the drum presence sensor 120 detects that the drum 95 or the conveyor belt 116 is not correctly position, or if the drum/UV compartment door latch sensor 52 determines the door is open. These sensors are provided for safety, so as to avoid spilling hazardous waste resin and rendering the system inoperable if the conveyor or drum are not in place, or to avoid hazardous operation if the compartment door has been opened, since actuating the second electro-mechanical lock 38 and unactuating the first electro-mechanical lock 38 returns the container 20 to the non-tilt position.

Dimensions and capacities are now provided for a non-limiting example embodiment of the invention, the W7500. This device is able to run unattended and features built-in carbon filtration, preventing operators from being exposed to toxic gases created when curing UV resins, which they would otherwise be exposed to had they been curing the waste resin manually without the device. In this example embodiment, the comb pitch is 5 points per inch, the flow regulating slot (outlet 65) is a 0.010-inch opening. The comb length is 6 inches, while the comb tooth length is 0.5-inch. The capacity of the W7500 is 7.5 liters, and it can convert 30 days' worth of waste resin in 6 hours from uncured hazardous liquid into solid plastic on an easily removeable substrate.

TABLE 1

Example Embodiment Parameters

| | |
|---|---|
| Compatible Resins | SLA, DLP, PolyJet, MultiJet |
| Vat Capacity | 7.5 Liters |
| Throughput | Cures 30 days' waste resin in 6 hours |
| Printed Plastic Stock | 14" (D) × 8" (H) Tube |
| Machine Size | 26.5" × 16.5" × 28.7" |
| Operating Temperature | 65-95° F. (18-35° C.) |
| Power Requirements | 100-120 VAC, 50-60 Hz |

The waste resin drops can range .050" to .125" in diameter depending on the parameters. The preferred embodiment of the drum would have a tube at 6" diameter and would be stiff enough to hold up to 50 lbs. of hardened plastic. The preferred thickness of cured plastic on the drum or conveyor belt is 3" to 4".

The tooth length should be at least 0.25", and the tooth pitch of the comb 55 can range between 3 to 10 teeth per inch.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An apparatus for hardening waste resin comprising:
   a container for holding the waste resin, the container comprising an outlet;
   a container pivot about which the container rotates to a tilt position that allows waste resin to flow out of the outlet under the force of gravity;
   a comb with a plurality of teeth in fluid connection with the container outlet, wherein the teeth are constructed to separate the waste resin flow from the container outlet into a plurality of streams of waste resin droplets under the force of gravity;
   a drum spindle;
   a drum over the drum spindle that (a) is positioned below the comb to receive the waste resin droplets, and (b) rotates as it receives the waste resin droplets; and
   a plurality of UV lights positioned to illuminate the drum and cause the waste resin droplets thereon to harden.

2. The apparatus of claim 1, further comprising an electro-mechanical lock that, when actuated, locks the container in the tilt position.

3. The apparatus of claim 2, further comprising:
   a capacity sensor that detects a thickness of the hardened resin droplets on the drum; and
   a processor connected to the capacity sensor and to the electro-mechanical lock, wherein the processor is constructed to perform the following steps:
   a. receive data from capacity sensor regarding the thickness of the hardened resin droplets on the drum; and
   b. actuate the electro-mechanical lock when the sensor data is below a preset threshold.

4. The apparatus of claim 1, wherein the outlet comprises a slot constructed to regulate the flow of the waste resin out of the container.

5. The apparatus of claim 1, further comprising a damper constructed to slow the movement of the container from the tilt position to a non-tilt position.

6. The apparatus of claim 1, wherein the drum is removable and comprised of cardboard, paper, plastic, metal or combinations thereof.

7. The apparatus of claim 1, wherein the container is removable from the apparatus.

8. The apparatus of claim 1, wherein the drum comprises:
   a surface that receives the resin droplets, and
   an axis about which the drum rotates, the axis defining a rotational plane;
   wherein the surface is substantially orthogonal to the rotational plane.

9. An apparatus for hardening waste resin from a waste resin source, the apparatus comprising:
   a comb with a plurality of teeth in fluid connection with the waste resin source, wherein the teeth are constructed to separate the waste resin flow from the waste resin source into a plurality of streams of waste resin droplets under the force of gravity;
   a conveyor surface that (a) is positioned below the comb to receive the waste resin droplets, and (b) moves as it receives the waste resin droplets; and a UV light positioned to illuminate the conveyor surface and cause the waste resin droplets thereon to harden.

10. The apparatus of claim 9, wherein the conveyor surface is propelled by at least one spindle that rotates about an axis, the axis defining a rotational plane, wherein the conveyor surface is substantially orthogonal to the rotational plane.

11. The apparatus of claim 9, further comprising a drum spindle, wherein the conveyor surface comprises a drum positioned over the drum spindle.

12. The apparatus of claim 11, wherein the drum is removable and comprised of cardboard, paper, plastic, metal, or combinations thereof.

13. The apparatus of claim 9, further comprising at least two conveyor belt spindles, wherein the conveyor surface comprises a conveyor belt positioned over the at least two conveyor belt spindles.

14. The apparatus of claim 13, wherein the conveyor belt is removable and comprised of cardboard, paper, plastic, metal or combinations thereof.

15. The apparatus of claim 9, wherein the UV light comprises a plurality of UV lights illuminating different portions of the conveyor surface.

16. The apparatus of claim 9, further comprising a capacity sensor that detects a thickness of the hardened resin droplets on the conveyor surface.

17. The apparatus of claim 9, further comprising a presence sensor that detects a proper position of the conveyor surface.

18. The apparatus of claim 9, wherein the waste resin source is a container comprising an outlet constructed to allow the waste resin to flow out of the container.

19. The apparatus of claim 18, further comprising a container pivot about which the container rotates to a tilt position that allows waste resin to flow out of the outlet under the force of gravity.

20. The apparatus of claim 19, further comprising a damper constructed to slow the movement of the container from the tilt position to a non-tilt position.

21. The apparatus of claim 19, further comprising an electro-mechanical lock that, when actuated, locks the container in the tilt position.

22. The apparatus of claim 21, further comprising:
a capacity sensor that detects a thickness of the hardened resin droplets on the conveyor surface; and
a processor connected to the sensor and to the electro-mechanical lock, wherein the processor is constructed to perform the following steps:
 a. receive data from sensor regarding the thickness of the hardened resin droplets on the conveyor surface; and
 b. actuate the electro-mechanical lock when the sensor data is below a preset threshold.

23. The apparatus of claim 18, wherein the outlet comprises a slot constructed to regulate the flow of the waste resin out of the container.

24. The apparatus of claim 21, further comprising a processor and a second electro-mechanical lock, wherein the processor actuates the second electro-mechanical lock to lock the container in the non-tilt position based on input from one or more sensors.

* * * * *